US012577812B2

(12) United States Patent
Eden et al.

(10) Patent No.: US 12,577,812 B2
(45) **Date of Patent: *Mar. 17, 2026**

(54) SECURITY TAG HOLDER

(71) Applicant: Fasteners for Retail, Inc., Twinsburg, OH (US)

(72) Inventors: Keith C. Eden, Loves Park, IL (US); Shane Obitts, North Ridgeville, OH (US); Jeffrey A. Comstock, Edgerton, WI (US)

(73) Assignee: Fasteners for Retail, Inc., Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,659

(22) Filed: Apr. 26, 2024

(65) Prior Publication Data

US 2024/0279964 A1 Aug. 22, 2024

Related U.S. Application Data

(63) Continuation of application No. 17/323,483, filed on May 18, 2021, now Pat. No. 12,000,178.

(60) Provisional application No. 63/026,233, filed on May 18, 2020.

(51) Int. Cl.
*E05B 73/00* (2006.01)
*G08B 13/24* (2006.01)

(52) U.S. Cl.
CPC ...... *E05B 73/0029* (2013.01); *E05B 73/0005* (2013.01); *E05B 73/0017* (2013.01); *G08B 13/2434* (2013.01)

(58) Field of Classification Search
CPC ............ E05B 73/0005; E05B 73/0017; E05B 73/0029; G08B 13/2434
See application file for complete search history.

(56) References Cited

U.S. PATENT DOCUMENTS 3,202,331 A 8/1965 McKinstrie
D229,085 S 11/1973 Lutenegger
D258,120 S 2/1981 Muramatsu
4,383,242 A 5/1983 Sassover et al.
(Continued)

FOREIGN PATENT DOCUMENTS

DE 102011012163 A1 8/2012
JP 2019128636 A 8/2019
(Continued)

OTHER PUBLICATIONS

Indyme smartresponse; 2 pages printed from internet http://www.indyme.com/; date last visited Apr. 8, 2013.
(Continued)

*Primary Examiner* — Christopher J Boswell
(74) *Attorney, Agent, or Firm* — Reinhart Boerner Van Deuren P.C.

(57) ABSTRACT

A security tag holder and a security tag assembly is provided. The security tag holder may have a holder body that defines a security tag holding cavity. First and second band retaining fingers may attached to the holder body on an opposite sides of the security tag holding cavity. The fingers are used to secure the holder to a retention band. The security tag holder may have a contact lever that cooperates with an alarm button of a security tag when the security tag assembly is mounted to a product.

26 Claims, 7 Drawing Sheets

(56) References Cited

U.S. PATENT DOCUMENTS

| | | | |
|---|---|---|---|
| 4,462,023 A | 7/1984 | Nielsen et al. | |
| D288,788 S | 3/1987 | Richard | |
| 4,649,552 A | 3/1987 | Yukawa | |
| D314,346 S | 2/1991 | Spencer et al. | |
| 4,996,515 A | 2/1991 | Schaffer et al. | |
| 5,068,643 A | 11/1991 | Yashina | |
| 5,086,641 A | 2/1992 | Roselli | |
| 5,097,705 A | 3/1992 | Porter | |
| 5,119,677 A | 6/1992 | Porter | |
| 5,168,263 A | 12/1992 | Drucker | |
| D337,067 S | 7/1993 | Patterson | |
| D342,035 S | 12/1993 | Glucroft | |
| 5,317,304 A | 5/1994 | Choi | |
| D347,584 S | 6/1994 | Vogelpohl | |
| D351,563 S | 10/1994 | DellaVilla | |
| 5,417,319 A | 5/1995 | Chalberg et al. | |
| D359,700 S | 6/1995 | Abrams | |
| 5,434,559 A | 7/1995 | Smiley et al. | |
| 5,469,135 A | 11/1995 | Solow | |
| 5,570,080 A | 10/1996 | Inoue et al. | |
| D376,544 S | 12/1996 | Egbert | |
| D391,508 S | 3/1998 | Lucas | |
| 5,757,270 A | 5/1998 | Mori | |
| 5,815,066 A | 9/1998 | Pumilia | |
| 5,838,225 A | 11/1998 | Todd | |
| 5,850,180 A | 12/1998 | Hess | |
| 5,905,438 A | 5/1999 | Weiss et al. | |
| 5,955,951 A | 9/1999 | Wischerop et al. | |
| 5,965,954 A | 10/1999 | Johnson et al. | |
| 5,977,654 A | 11/1999 | Johnson et al. | |
| 5,979,674 A | 11/1999 | Thalenfeld | |
| D419,899 S | 2/2000 | Levar et al. | |
| D421,927 S | 3/2000 | Binder et al. | |
| D422,487 S | 4/2000 | Khokhar | |
| 6,049,268 A | 4/2000 | Flick | |
| D424,463 S | 5/2000 | Babers, Jr. | |
| D427,104 S | 6/2000 | Cooper | |
| 6,133,830 A | 10/2000 | D'Angelo et al. | |
| D445,682 S | 7/2001 | Michael et al. | |
| D446,118 S | 8/2001 | Michael et al. | |
| 6,326,890 B1 | 12/2001 | Costa | |
| D453,483 S | 2/2002 | Choe | |
| 6,373,381 B2 | 4/2002 | Wu | |
| D459,206 S | 6/2002 | Caveney et al. | |
| 6,517,000 B1 | 2/2003 | McAllister et al. | |
| 6,577,388 B2 | 6/2003 | Kallabis | |
| D478,831 S | 8/2003 | So | |
| 6,604,643 B1 | 8/2003 | Michael et al. | |
| 6,628,344 B1 | 9/2003 | Weber | |
| 6,690,411 B2 | 2/2004 | Naidoo et al. | |
| 6,769,557 B2 | 8/2004 | Michael et al. | |
| 6,912,878 B2 | 7/2005 | Belden, Jr. | |
| 6,967,578 B1 | 11/2005 | Guida | |
| 7,004,340 B2 | 2/2006 | Belden, Jr. | |
| 7,007,523 B2 | 3/2006 | Belden, Jr. | |
| D520,393 S | 5/2006 | Darby | |
| D525,198 S | 7/2006 | Ikeda et al. | |
| D528,020 S | 9/2006 | Brown et al. | |
| 7,100,783 B2 | 9/2006 | Belden, Jr. | |
| 7,100,784 B2 | 9/2006 | Belden, Jr. | |
| D534,822 S | 1/2007 | Wadda | |
| D535,205 S | 1/2007 | Frederick et al. | |
| D536,627 S | 2/2007 | Behling | |
| 7,174,176 B1 | 2/2007 | Liu | |
| 7,210,164 B1 | 4/2007 | Jandrell | |
| 7,258,461 B1 | 8/2007 | Izardel | |
| 7,259,967 B2 | 8/2007 | Ni | |
| 7,321,308 B1 | 1/2008 | Feibelman | |
| D565,973 S | 4/2008 | Huang et al. | |
| 7,350,652 B2 | 4/2008 | Belden, Jr. | |
| 7,350,653 B2 | 4/2008 | Belden, Jr. | |
| 7,350,654 B2 | 4/2008 | Belden, Jr. | |
| 7,350,655 B2 | 4/2008 | Belden, Jr. | |
| D573,903 S | 7/2008 | Gatz et al. | |
| 7,397,375 B2 | 7/2008 | Marsilio et al. | |
| D578,906 S | 10/2008 | Gatz et al. | |
| D579,788 S | 11/2008 | Brady et al. | |
| 7,463,152 B2 | 12/2008 | Marsilio et al. | |
| D584,172 S | 1/2009 | Soltani | |
| 7,486,190 B2 | 2/2009 | Marsilio et al. | |
| 7,492,263 B2 | 2/2009 | Marsilio et al. | |
| 7,492,264 B2 | 2/2009 | Marsilio et al. | |
| 7,492,265 B2 | 2/2009 | Marsilio et al. | |
| 7,498,944 B2 | 3/2009 | Marsilio et al. | |
| 7,498,945 B2 | 3/2009 | Marsilio et al. | |
| 7,522,048 B2 | 4/2009 | Belden, Jr. | |
| 7,530,188 B2 | 5/2009 | Beilenhoff et al. | |
| 7,543,466 B2 | 6/2009 | Loughlin et al. | |
| 7,552,048 B2 | 6/2009 | Xu et al. | |
| 7,584,930 B2 | 9/2009 | Zich | |
| 7,591,422 B2 | 9/2009 | Maitin | |
| 7,602,297 B2 | 10/2009 | Marsilio et al. | |
| D607,347 S | 1/2010 | Goh et al. | |
| 7,650,768 B2 | 1/2010 | Fawcett et al. | |
| 7,671,741 B2 | 3/2010 | Lax et al. | |
| 7,671,742 B2 | 3/2010 | Fallin et al. | |
| 7,768,399 B2 | 8/2010 | Hachmann et al. | |
| 7,916,020 B2 | 3/2011 | Seidel | |
| D638,324 S | 5/2011 | Tang | |
| 7,969,305 B2 | 6/2011 | Belden, Jr. et al. | |
| 7,984,629 B2 | 7/2011 | Xiaobin | |
| D649,895 S | 12/2011 | Stifle et al. | |
| 8,103,047 B1 | 1/2012 | Griess et al. | |
| 8,139,945 B1 | 3/2012 | Amir et al. | |
| 8,274,391 B2 | 9/2012 | Yang | |
| 8,305,219 B2 | 11/2012 | Yang | |
| D672,667 S | 12/2012 | Mix | |
| 8,368,542 B2 * | 2/2013 | Yang | G08B 13/1463 340/572.1 |
| 8,368,543 B2 * | 2/2013 | Yang | G08B 13/2434 340/572.1 |
| 8,373,564 B2 | 2/2013 | Wyatt, Jr. et al. | |
| 8,373,565 B2 * | 2/2013 | Yang | G08B 13/2434 340/572.1 |
| 8,378,826 B2 | 2/2013 | Mercier et al. | |
| D679,618 S | 4/2013 | Dumas et al. | |
| D688,967 S | 9/2013 | Wilson | |
| 8,528,372 B2 | 9/2013 | Nilsson | |
| 8,534,469 B2 | 9/2013 | Northrup, Jr. et al. | |
| 8,629,772 B2 | 1/2014 | Valiulis et al. | |
| 8,640,509 B2 | 2/2014 | Will | |
| D706,500 S | 6/2014 | Hu | |
| D707,823 S | 6/2014 | Scherbing | |
| D708,534 S | 7/2014 | Martin | |
| 8,884,761 B2 | 11/2014 | Valiulis | |
| 8,938,997 B2 | 1/2015 | Piccoli et al. | |
| 9,009,773 B1 | 4/2015 | Hendricks et al. | |
| D730,225 S | 5/2015 | Behar | |
| D733,601 S | 7/2015 | Solow | |
| D733,714 S | 7/2015 | Ballou et al. | |
| D736,657 S | 8/2015 | Detering et al. | |
| 9,169,670 B2 * | 10/2015 | Shute | E05B 73/0017 |
| D742,817 S | 11/2015 | Lammers-Meis et al. | |
| D749,592 S | 2/2016 | Huang | |
| D751,558 S | 3/2016 | Lee | |
| D752,469 S | 3/2016 | Rastrick | |
| 9,324,220 B2 | 4/2016 | Valiulis | |
| 9,404,291 B1 | 8/2016 | White et al. | |
| D767,435 S | 9/2016 | Lee | |
| D770,321 S | 11/2016 | Murphy et al. | |
| 9,524,626 B2 | 12/2016 | Brühwiler et al. | |
| D782,342 S | 3/2017 | Dwivedula et al. | |
| D782,475 S | 3/2017 | Yu et al. | |
| D802,466 S | 11/2017 | Yu | |
| 9,830,792 B1 | 11/2017 | Yang | |
| D807,877 S | 1/2018 | Iwamatsu et al. | |
| D813,659 S | 3/2018 | Ostoyic | |
| D815,551 S | 4/2018 | Taylor et al. | |
| 9,934,665 B1 | 4/2018 | Zhang | |
| 9,965,933 B1 | 5/2018 | Schneider et al. | |
| D823,841 S | 7/2018 | Marini | |
| 10,066,422 B2 | 9/2018 | Yang | |
| 10,121,340 B2 | 11/2018 | Yang | |
| D835,364 S | 12/2018 | Lee et al. | |

(56) References Cited

U.S. PATENT DOCUMENTS

| | | | |
|---|---|---|---|
| D838,854 S | 1/2019 | Lumme | |
| 10,309,663 B1 | 6/2019 | Taber et al. | |
| D863,995 S | 10/2019 | Ueda | |
| D867,188 S | 11/2019 | Virhia et al. | |
| D870,399 S | 12/2019 | Van Curen et al. | |
| 10,529,207 B1 | 1/2020 | Yang | |
| D890,456 S | 7/2020 | Dai | |
| D896,117 S | 9/2020 | Nagel et al. | |
| D908,112 S | 1/2021 | Eshelman et al. | |
| 10,885,753 B2 | 1/2021 | Ewing et al. | |
| D909,216 S | 2/2021 | Vuletici et al. | |
| D920,824 S | 6/2021 | Matula et al. | |
| D921,499 S | 6/2021 | Konotopskyi et al. | |
| D922,883 S | 6/2021 | Tabbah | |
| D928,011 S | 8/2021 | Vonau et al. | |
| 11,087,601 B1 | 8/2021 | Ewing et al. | |
| D946,569 S | 3/2022 | Yang et al. | |
| 11,322,005 B2 | 5/2022 | Wang et al. | |
| D955,907 S | 6/2022 | Abellera et al. | |
| D956,607 S | 7/2022 | Eden et al. | |
| D979,436 S | 2/2023 | Boucard et al. | |
| D987,915 S | 5/2023 | Luo | |
| D988,167 S | 6/2023 | Eden et al. | |
| D990,076 S | 6/2023 | Li | |
| D990,563 S | 6/2023 | Kane | |
| D991,593 S | 7/2023 | Zhang | |
| D992,441 S | 7/2023 | Saladino | |
| D994,238 S | 8/2023 | Xiao | |
| D995,954 S | 8/2023 | Luo | |
| D996,254 S | 8/2023 | Rosengarten | |
| D1,019,444 S | 3/2024 | Eden et al. | |
| D1,019,445 S | 3/2024 | Eden et al. | |
| D1,019,446 S | 3/2024 | Eden et al. | |
| 12,000,178 B2 * | 6/2024 | Eden | E05B 73/0017 |
| 2002/0067259 A1 | 6/2002 | Fufidio et al. | |
| 2002/0130776 A1 | 9/2002 | Houde | |
| 2002/0188866 A1 | 12/2002 | Ca et al. | |
| 2003/0030548 A1 | 2/2003 | Kovacs et al. | |
| 2003/0175004 A1 | 9/2003 | Garito et al. | |
| 2003/0227382 A1 | 12/2003 | Breed | |
| 2004/0145477 A1 | 7/2004 | Easter et al. | |
| 2004/0237267 A1 | 12/2004 | Copen et al. | |
| 2005/0093704 A1 | 5/2005 | Fiebelman | |
| 2005/0104733 A1 | 5/2005 | Campero | |
| 2005/0261816 A1 | 11/2005 | DiCroce et al. | |
| 2006/0198611 A1 | 9/2006 | Park | |
| 2007/0115100 A1 | 5/2007 | Mandle | |
| 2007/0171059 A1 | 7/2007 | Pistilli | |
| 2009/0079557 A1 | 3/2009 | Miner | |
| 2009/0095695 A1 | 4/2009 | Moock et al. | |
| 2009/0109027 A1 | 4/2009 | Schuller | |
| 2009/0308494 A1 | 12/2009 | Linn | |
| 2010/0069848 A1 | 3/2010 | Alferness et al. | |
| 2010/0097223 A1 | 4/2010 | Kruest et al. | |
| 2010/0154265 A1 | 6/2010 | Poulokefalos | |
| 2010/0175438 A1 | 7/2010 | Sankey | |
| 2010/0253524 A1 | 10/2010 | Kolton et al. | |
| 2011/0062794 A1 | 3/2011 | Vergoossen et al. | |
| 2011/0068921 A1 | 3/2011 | Shafer | |
| 2011/0215060 A1 | 9/2011 | Niederhuefner | |
| 2011/0227706 A1 | 9/2011 | Yang | |
| 2011/0227735 A1 | 9/2011 | Fawcett et al. | |
| 2011/0260594 A1 | 10/2011 | Yang | |
| 2011/0310307 A1 | 12/2011 | Takahashi | |
| 2012/0031980 A1 | 2/2012 | Tiedmann | |
| 2012/0287090 A1 | 11/2012 | Cacioppo | |
| 2013/0057524 A1 | 3/2013 | Bertin et al. | |
| 2013/0142494 A1 | 6/2013 | Valiulis et al. | |
| 2014/0055264 A1 | 2/2014 | Valiulis et al. | |
| 2014/0070948 A1 | 3/2014 | Valiulis et al. | |
| 2015/0042178 A1 | 2/2015 | Kim | |
| 2015/0287299 A1 | 10/2015 | Eckert et al. | |
| 2015/0298885 A1 | 10/2015 | Giller | |
| 2016/0356064 A1 | 12/2016 | Ewing et al. | |
| 2021/0279539 A1 | 9/2021 | Eden et al. | |
| 2021/0355715 A1 | 11/2021 | Eden et al. | |
| 2022/0083137 A1 | 3/2022 | Fountain | |
| 2022/0149509 A1 | 5/2022 | Kawasaki et al. | |
| 2024/0078883 A1 | 3/2024 | Zhang | |

FOREIGN PATENT DOCUMENTS

| | | | |
|---|---|---|---|
| KR | 100823026 | B1 | 4/2008 |
| KR | 20100137956 | A | 12/2010 |
| KR | 2020110002261 | U | 3/2011 |
| KR | 20110043837 | A | 4/2011 |
| KR | 20110080411 | A | 7/2011 |
| WO | WO 01/81988 | A2 | 11/2001 |
| WO | WO 2009/100857 | A1 | 8/2009 |
| WO | WO 2011/025085 | A1 | 3/2011 |
| WO | WO 2012/113536 | A1 | 8/2012 |

OTHER PUBLICATIONS

U.S. Appl. No. 29/863,693, Garduno, filed Dec. 21, 2022.
U.S. Appl. No. 18/415,265, Garduno et al., filed Jan. 17, 2024.

* cited by examiner

SECURITY TAG HOLDER

CROSS-REFERENCE TO RELATED PATENT APPLICATIONS

This patent application is a Continuation of U.S. patent application Ser. No. 17/323,483 filed May 18, 2021, which is now pending. This patent application claims the benefit of U.S. Provisional Patent Application No. 63/026,233, filed May 18, 2020, the entire teachings and disclosure of which are incorporated herein by reference thereto.

FIELD OF THE INVENTION

This invention generally relates to retail merchandise security devices, and more particularly to retail merchandise security devices which are affixed to retail merchandise to provide anti-theft functionality.

BACKGROUND OF THE INVENTION

There are various methods and devices employed by retail establishments to deter or prevent retail theft. One common approach is to affix a security device directly to a product. Such security devices employ some mode of anti-theft functionality. As one example, it is known to affix an RFID tag directly to a product. A gate is positioned at an exit point of the retail establishment. If the RFID passes through the gate without being deactivated, an alarm will sound. Such RFID tags are oftentimes a small tag with an adhesive back which is adhered directly to a product or its packaging.

However, some packaging does not readily allow for the use of such tags. Indeed, it is not uncommon to utilize shrink wrap on the exterior of a package. Such a packaging arrangement is provided at the source and thus the retail establishment must accommodate their security device to this packaging. Adhesive back RFID tags are not readily employed in such a configuration as they would need to be adhered to the shrink wrap, which can be easily removed in-store by a would be thief.

To address this, there are security devices which are referred to in the art as box wraps. Such box wraps include a central hub housing an anti-theft arrangement and a spool. A cable of fixed length is attached to the spool at both ends thereof. As a result, a loop of cable may be drawn from or taken up by the central hub. The loop is first enlarged and merchandise is passed through the loop. The loop is then taken up by the spool so that the cable is tightly wound around the merchandise such that the security device is effectively affixed to the merchandise. There is typically a locking mechanism within the central hub which prevents the loop from being enlarged again which would otherwise allow for the unwanted removal of the security device. Once activated, the device will sound an alarm if not deactivated, and or, if the device is tampered with, e.g. the cable loop is cut.

Typically, the anti-theft componentry is contained within the central hub. If a retail establishment wishes to change their anti-theft methodology to something which is not compatible with the anti-theft componentry of their existing devices, their existing security devices are rendered entirely obsolete.

Further yet, in other security devices, the security device may have a button that presses against the retail merchandise. When the security device is removed from the retail merchandise, an alarm will be triggered. However, these buttons are often small and it can be difficult to maintain compression of the button.

As such, there is a need in the art for a security device which can accommodate a broad range of retail packaging sizes rather than being limited to a maximum size of retail merchandise before it must be entirely replaced. There is also a need for a security device that can accommodate retail packaging of various shapes, and a device that is adaptable to differing anti-theft methodologies.

BRIEF SUMMARY OF THE INVENTION

The application provides new and improved security devices that provide anti-theft functionality.

In one example, a security tag holder is provided. The tag holder can be used to hold a security tag. The tag holder includes a holder body that defines a security tag holding cavity. A first band retaining finger is attached to the holder body. A second band retaining finger is attached to the holder body on an opposite side of the security tag holding cavity as the first band retaining finger. The security tag holding cavity is interposed between the first and second band retaining fingers.

In an example, the first and second band retaining fingers are oppositely oriented relative to one another (e.g. extend in opposite directions). In one example the band retaining fingers extend parallel to one another, but in opposite directions.

In an example, each of the first and second band retaining fingers includes a connection portion and a band retaining portion. The connection portion secures the band retaining portion to the holder body.

In an example, for each of the first and second band retaining fingers, a band receiving slit is formed between the band retaining portion and the holder body.

In an example, for each of the first and second band retaining fingers, the band retaining portion extends from the connection portion over a portion of the holder body in a cantilevered orientation.

In an example, for each of the first and second band retaining fingers, the band retaining portion includes a retaining nib projecting towards the holder body.

In an example, the holder body includes a first recess receiving the retaining nib of the first band retaining finger and the holder body includes a second recess receiving the retaining nib of the second band retaining finger. Note the nibs are received when no band is being engaged by the band retaining fingers. With a band being secured by the band retaining fingers, the thickness of the band may prevent the nibs from being received in the recesses.

In an example, the band retaining fingers are flexible to allow for securement or removal of a retention band.

In an example, the holder body includes a first side and a second side, the first and second sides being spaced apart with the security tag holding cavity being positioned therebetween. The first band retaining finger is mounted to a top of the first side and the second band retaining finger is mounted to the top of the second side.

In an example, the holder body is annular body that surrounds the security tag holding cavity. The annular body may be open on both the top or bottom ends.

In another example, a security tag holder including a holder body and a contact lever is provided. The holder body defines a security tag holding cavity. The contact lever is hingedly attached to the holder body for pivoting motion about a pivot axis. The contact lever extends across the security tag holding cavity. The contact lever has a free end spaced away from the pivot axis. The contact lever pivots between an alarm position and an inactive position, the free end being positioned closer to the holder body in the inactive position than in the alarm position.

In an example, the contact lever has an outer surface that faces away from or otherwise outward relative to the holder body. The outer surface being curved at least proximate the free end.

In an example, the contact lever has an outer surface that faces away from the holder body. The outer surface is convexly curved. This allows for improved contact with retail merchandise packaging.

In an example, the holder body has a bottom end. The bottom end includes a notch therein. The contact lever is positioned with in the notch when in the inactive position. In use, the bottom end would face the retail merchandise packaging to which the security tag holder is attached.

In an example, the contact lever may pivot about the pivot axis such that the pivot lever is flush with or recessed above the bottom end of the holder body.

In an example, the holder body has a first side and a second side spaced from the first side. The security tag holding cavity is formed, at least in part, between the first and second sides. The first side has an inner face that faces towards the second side. The contact lever is pivotable about the pivot axis such that the free end is pivotable into the security tag holding cavity with the free end of the contact lever positioned adjacent to the inner face of the first side.

In an example, the contact lever is hingedly attached to the holder body proximate the second side.

In an example, the outer surface is curved for less than half of the distance between the free end and the pivot axis.

In an example, the contact lever has a pair of legs that are laterally spaced apart along the pivot axis. The holder body includes at least one mounting projection. The pair of legs pivotally engage the at least one mounting projection to pivotally secure the contact lever to the holder body.

In an example, a pair of nibs provided by the pair of legs or the at least one mounting projection and a pair of recesses provided by the other one of the pair of legs or the at least one mounting projection are provided. The pair of nibs engage the pair of recesses to secure the contact lever to the holder body, to define the pivot axis, and to permit pivotal motion between the holder body and the contact lever.

In an example, the hinged attachment between the contact lever and the holder body is free of a separate hinge pin.

In another example, a security tag assembly comprising a security tag and a security tag holder as outlined above is provided.

In another example a security tag assembly comprising a security tag and a security tag holder outlined above having a contact lever is provided. The security tag has a housing and an alarm button. The alarm button is movable relative to the housing body between an extended state and a retracted state. The alarm button projecting from the bottom side a further distance in the extended state than in the retracted state. The security tag can generate an alarm when the alarm button is in the retracted state. The security tag is mounted within the security tag holding cavity of the security tag holder. The contact lever transitions the alarm button from the extended state to the retracted state when the contact lever is transitioned from the alarm position to the inactive position.

In an example, the alarm button is biased from the retracted state towards the extended state by a biasing force. The biasing force being sufficient to bias the contact lever from the inactive position to the alarm position when the contact lever is not in engagement with an object.

In an example, a retention band for securing the security tag holder to an object is provided. The retention band is configured to maintain the contact lever in the inactive position when the security tag and retention band are mounted to the object.

In an example, the holder body includes first and second band retaining fingers as well as a retention band. The first band retaining finger is attached to the holder body. The second band retaining finger is attached to the holder body on an opposite side of the security tag holding cavity as the first band retaining finger with the security tag holding cavity being interposed between the first and second band retaining fingers. The retention band is secured to the holder body by the first and second band retaining fingers.

In an example, the retention band will extend across a top surface of the security tag when attached to the holder body.

In another example, a retail package is provided. The retail package includes a product, a security tag assembly as outlined above and a retention band. The retention band extends around the product and secures the security tag assembly to the product. The retention band maintains the contact lever in contact with an outer surface of the product to maintain the contact lever in the inactive position. The contact lever transitions to the alarm position when the holder body is lifted away from the outer surface of the product or slid off of the product. Note, that the contact lever may remain in contact with the outer surface of the product, as long as the contact lever is still allowed to pivot towards the alarm position.

In an example, the biasing force biasing the alarm button transitions the contact lever to the alarm position when the holder body is lifted away from the product or slid off of the product.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
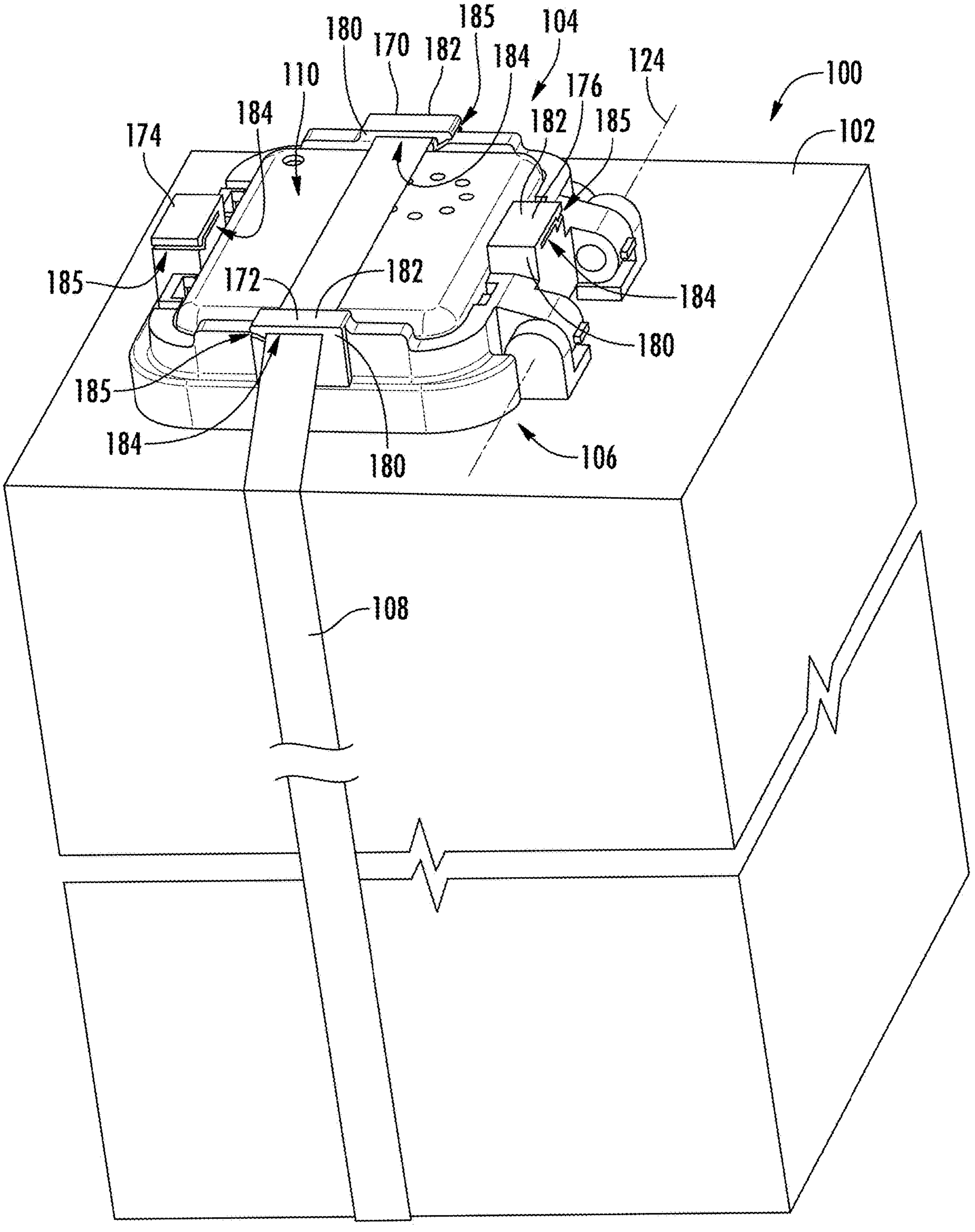
FIG. 1 is a perspective illustration of a package incorporating a security tag assembly according to an example of the application.

FIG. 1 illustrates a retail package 100 according to an example of the application. The retail package 100 includes a product 102 that is protected by a security tag assembly 104. The security tag assembly 104 is configured to generate an alarm when removed from or sufficiently spaced from the outer surface of product 102. The alarm may be a signal that is sent to a remote location that is monitored by security personnel, the alarm may be an audio alarm, the alarm may be a visual alarm or any combination thereof. Also, the security tag assembly 104 may generate any one of these alarms if it is passed through a security check point, such as at the door of a retail establishment.

The security tag assembly 104 includes a security tag holder 106, a retention band 108 and a security tag 110. The security tag 110 is mounted within the security tag holder 106 and the retention band 108 secures the security tag holder 106 and security tag 110 operably to the product 102.

The retention band 108 may be an elastic band or a non-elastic band. The retention band 108 may be non-elastic but adjustable in size such that it can be used with different sized products 102. Further, while the retention band 108 is illustrated as a separate component other embodiments may incorporate the retention band in the security tag holder 106.

Figure 2:
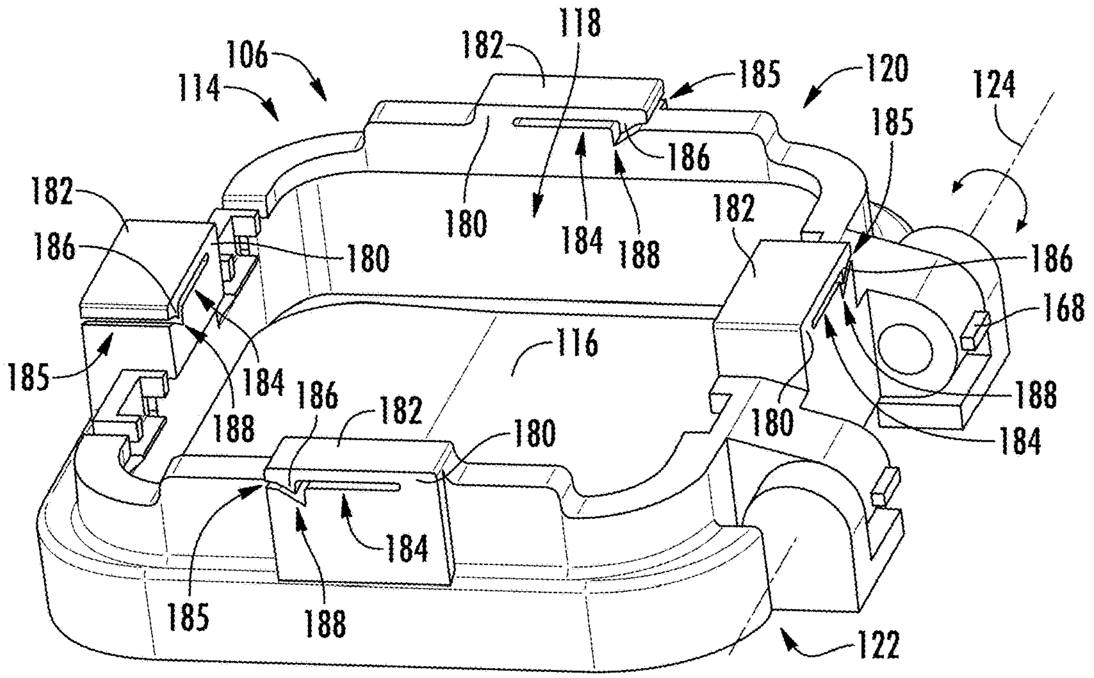
FIG. 2 is a perspective illustration of the security tag holder having the contact lever in an inactive position.
Figure 3:
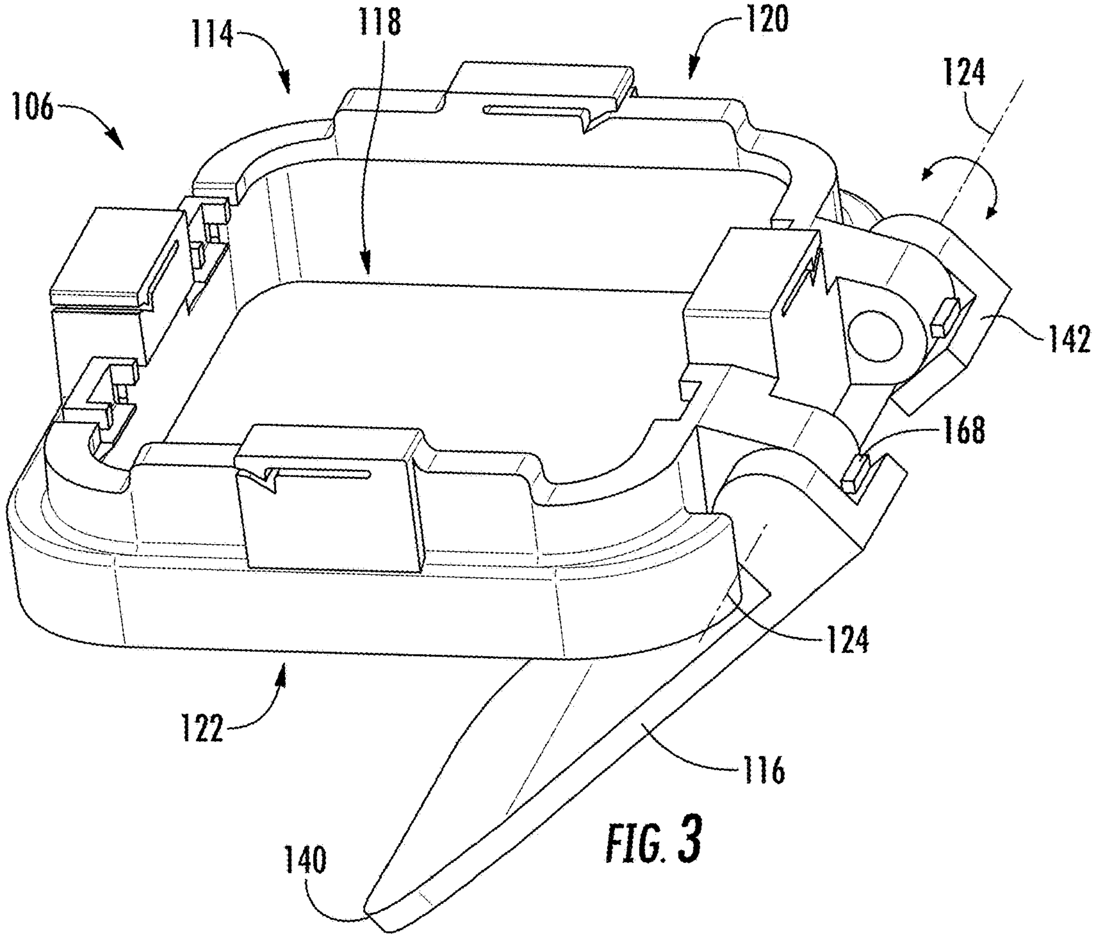
FIG. 3 is a perspective illustration of the security tag holder having the contact lever in an alarm position.

With additional reference to FIGS. 2 and 3, the security tag holder 106 is removed from product 102. The security tag holder 106 includes a holder body 114 and a contact lever 116. The holder body 114 defines a security tag holding cavity 118 that receives the security tag 110.

In the illustrated example, the holder body 114 is generally rectangular including two sets of opposed sides. However, other shapes and configurations as contemplated such as oval, triangular, circular, etc. Further, an oval or circle can be considered to have opposed sides for purposes of this application. Further, while the holder body 114 in this example is open from a top side 120 and a bottom side 122 such that the security tag holding cavity 118 is accessible from both the top side 120 and the bottom side (see e.g. FIG. 3), in other examples, the top side 120 could be closed by way of a top wall an still be considered a holder body.

The contact lever 116 is hingedly attached to the holder body 114 for pivotal movement about a pivot axis 124 between an alarm position (FIGS. 3, 4, and 5) and an inactive position (FIGS. 1, 2, 6, and 7). The inactive position corresponds to the position when the security tag holder 106 is mounted to a product 102 (see e.g. FIGS. 1 and 7). In this position, the retention band 108 presses the security tag holder 106 into the product 102 to maintain the contact lever 116 in the position illustrated in FIGS. 2, 6 and 7.

Further, in at least this position, the contact lever 116 extends across security tag holding cavity 118. In this example, the contact lever 116 extends at least 50 percent the distance D1 between the opposed sides of the holder body 114 and preferably at least 75 percent (see e.g. FIG. 5). In an example, the contact lever 116 is sized to cover at least 50 percent and more preferably at least 75 percent of the surface are of the opening in the bottom of the holder body 114 that provides access to the cavity 118.

In this position, the contact lever 116 presses an alarm button 128 of the security tag 110 into housing 130 of the security tag 110. Thus, in this position, the alarm button 128 extends a first extent from the bottom 131 of the security tag 110. In this position, the security tag 110 is not generating an alarm due to removal of the security tag assembly 104/security tag 110 from the product 102.

The alarm position corresponds to the position when the security tag holder 106 is sufficiently removed from the product 102. This is typically achieved when the security tag holder 106 is either lifted away from the product 102 by stretching or breaking the retention band 108 (see e.g. FIG. 5) or the security tag assembly 104 is laterally slid off of the product 102 (see e.g. FIG. 4). In either situation, the security tag holder 106 is moved relative to the product 102 such that the product is no longer sufficiently acting on contact lever 116.

Thus, pivotal motion between the alarm position and the inactive position of the contact lever 116 activates and deactivates the alarm feature of the security tag 110.

Figure 4:
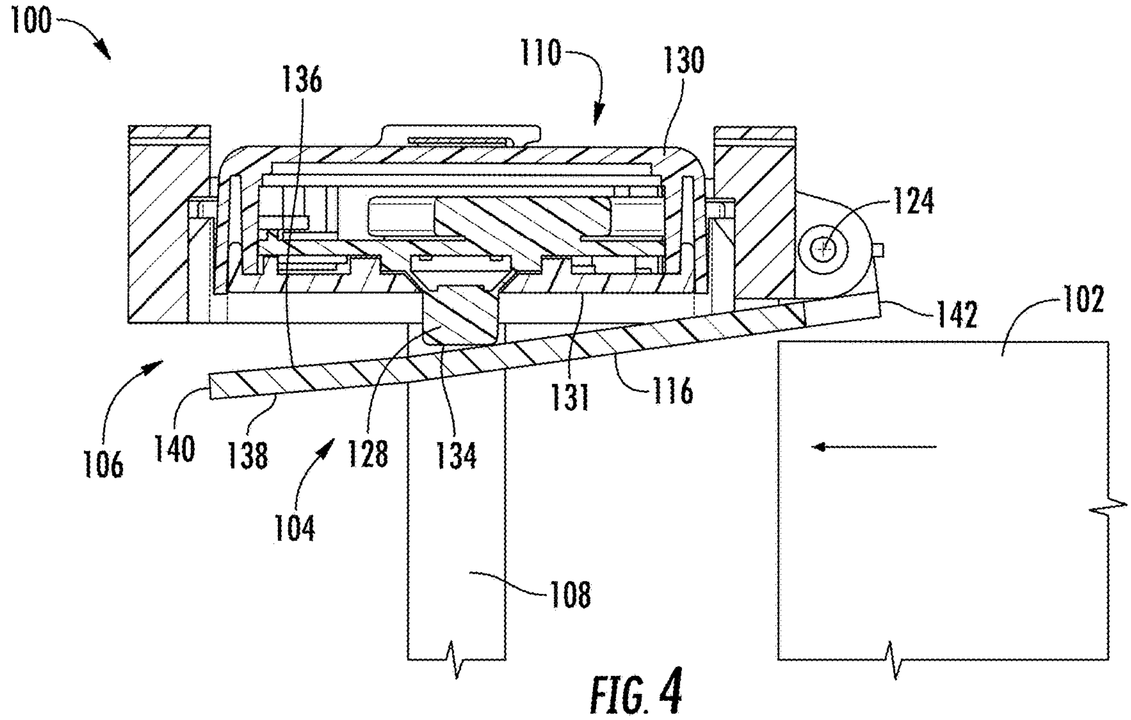
FIG. 4 is a cross-sectional illustration showing a first way that an alarm can be triggered.

With reference to FIG. 4, the alarm button 128 has a distal end 134 that engages an inner surface 136 of the contact lever 116. An opposite bottom surface 138 also referred to as an outer surface is configured to properly engage the product 102.

In an example, the bottom surface 138 is curved in a convex manner. This curved configuration improves the engagement of the contact lever 116 with the product 102, particularly if the product 102 may have a concave or recessed outer surface.

In an example, the curved portion 139 of the bottom surface 138 is proximate a distal end 140 of the contact lever 116. This distal end 140 is opposite the connection end 142 of the contact lever 116, which is proximate the pivotal connection of the contact lever 116 to the holder body 114.

In one example, the curved portion of the bottom surface 138 extends less than half of the distance between the distal end 140 and the connection end 142.

Figure 6:
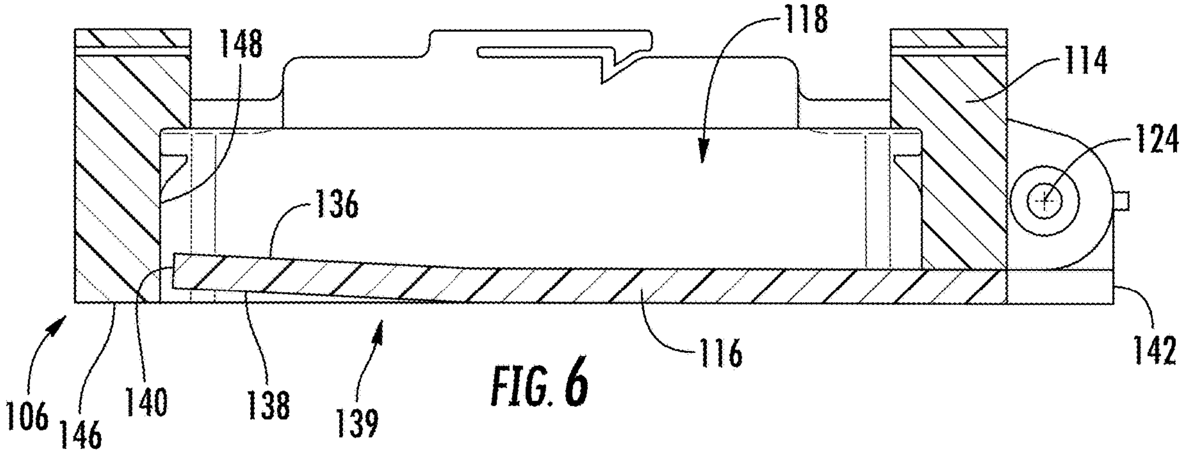
FIG. 6 is a cross-sectional illustration of the security tag holder with the contact lever in an inactive position.
Figure 7:
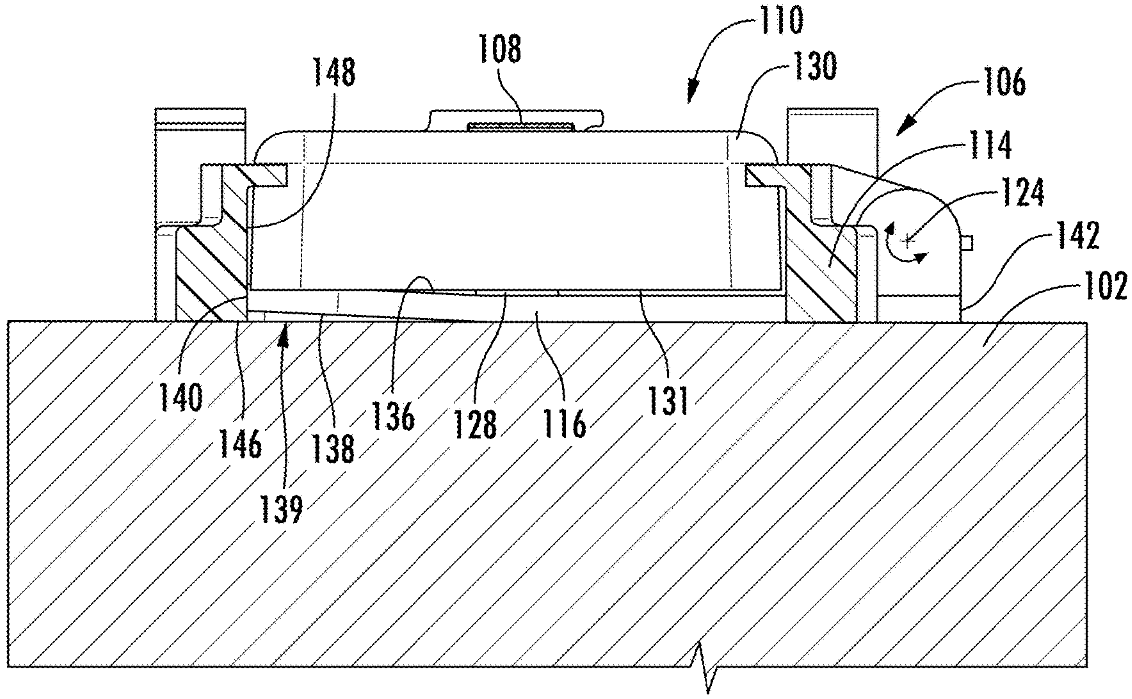
FIG. 7 is a cross-sectional illustration illustrating the security tag assembly mounted to a product with the contact lever in an inactive position.

In some examples, the contact lever 116 is configured such that it may be sufficiently pivoted about axis 124 such that bottom surface 138 of contact lever 116 is fully recessed inward from a bottom surface 146 of the holder body 114 or at most flush with bottom surface 146 (see e.g. FIGS. 6 and 7). When in the inactive position, the distal end 140 is preferably received within the security tag holding cavity 118 such that distal end 140 is positioned adjacent an inner face 148 of a side of the holder body 114.

In some examples, the distal end 140 is closer to or received within the holder body 114 when in the inactive position than when in the alarm position.

Figure 8:
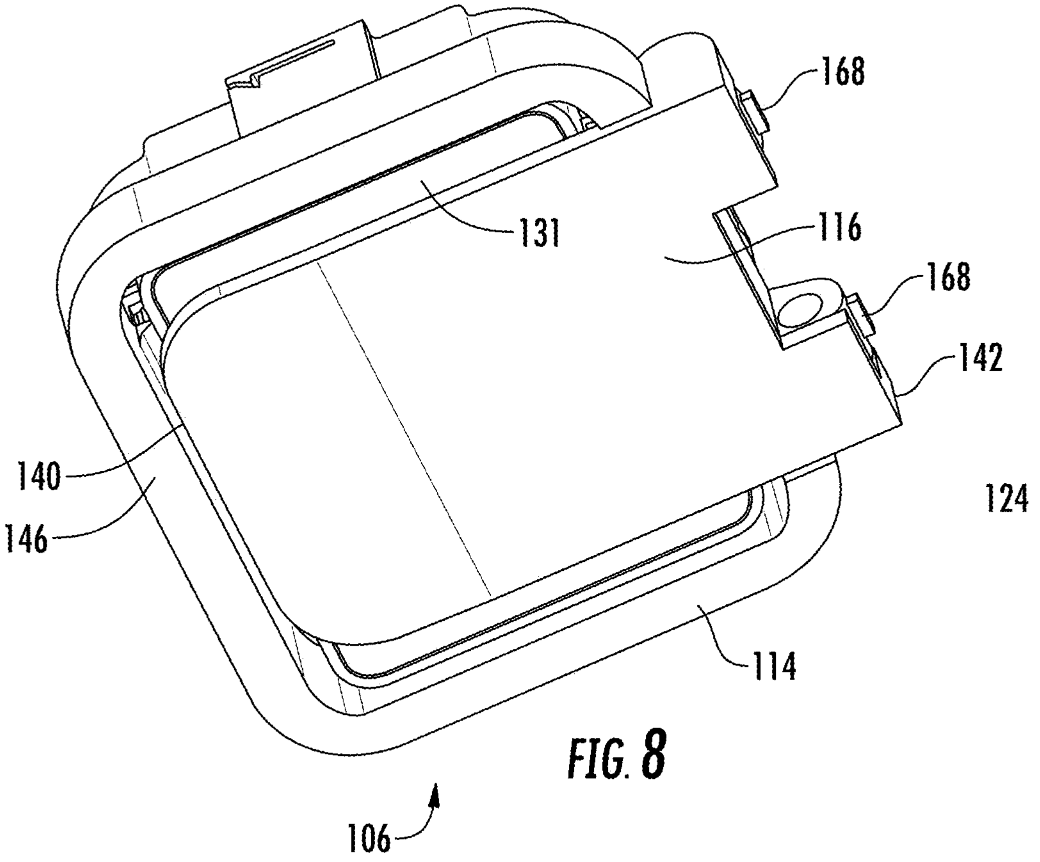
FIG. 8 is a bottom perspective illustration of the security tag holder with the contact lever in the inactive position.
Figure 9:
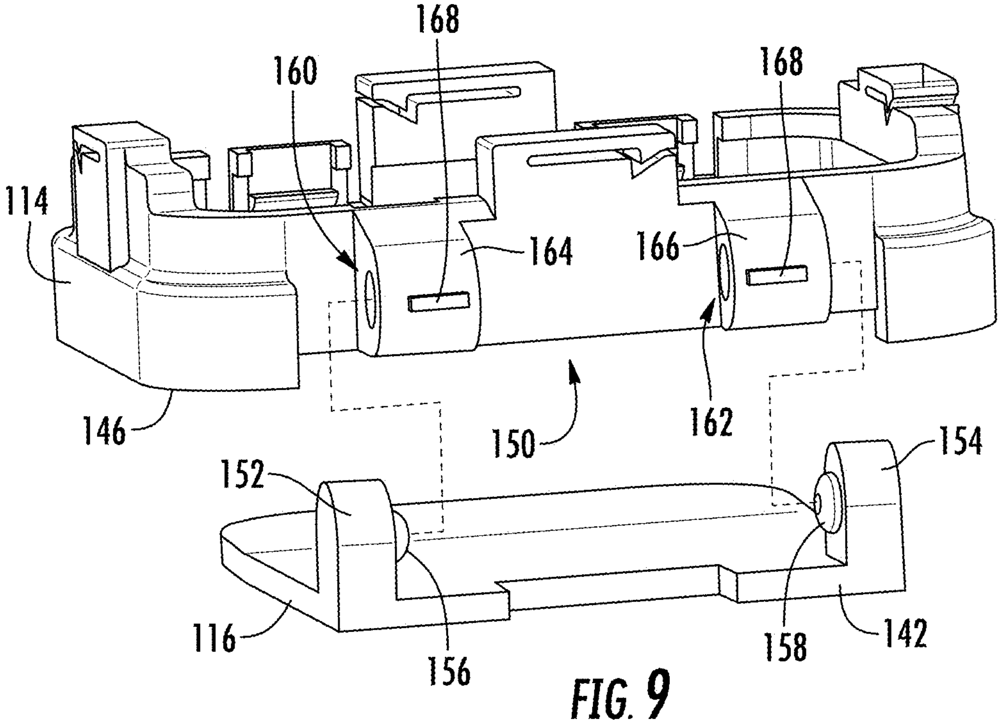
FIG. 9 is an exploded illustration of the security tag holder.
Figure 10:
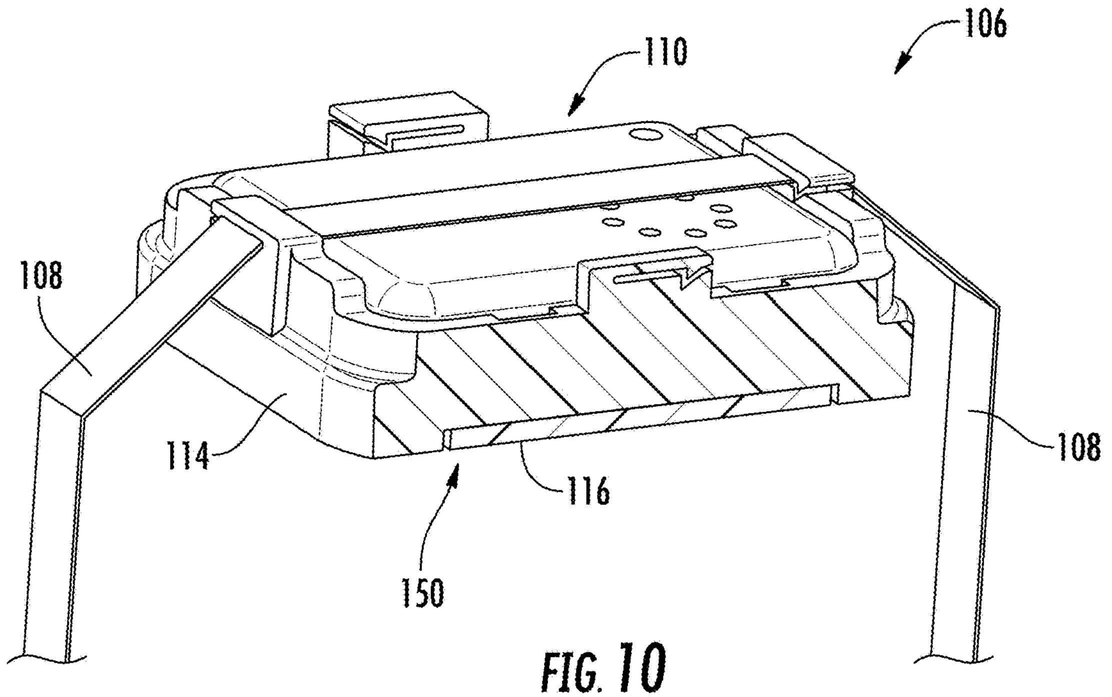
FIG. 10 is a perspective cross-sectional illustration of the security tag holder.
Figure 11:
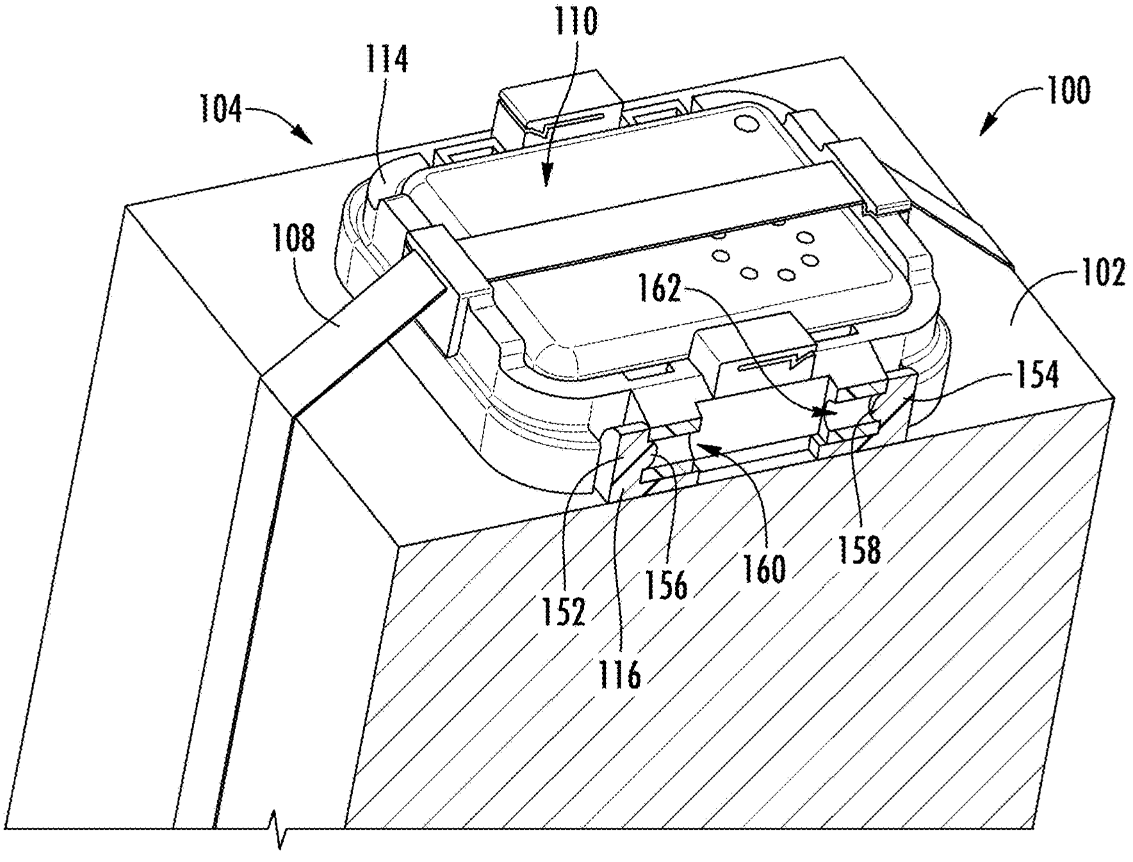
FIG. 11 is a further perspective cross-sectional illustration of the security tag holder.

With reference to FIGS. 8 and 9, the holder body 114 includes a notch 150 formed in the bottom surface 146 thereof. This notch 150 allows for the recessed/flushed relationship between the bottom surface 146 of the holder body 114 and the bottom surface 138 of the contact lever 116.

The contact lever 116 and holder body 114, in this example, are connected without the use of a hinge pin. This allows for a simpler assembly and reduces the number of parts that are needed for manufacture and/or assembly. However, other examples could include such a hinge pin.

In this example, the contact lever 116 includes a pair of spaced apart legs 152, 154. The legs 152, 154, each include an inward extending retaining nib 156, 158, respectively. These retaining nibs 156, 158 are pivotally engaged with recesses 160, 162 formed in connection projections 164, 166. In this example, the recesses 160, 162 are through bores formed entirely through the connection projections 164, 166. However, in other embodiments, the recesses 160, 162 could simply be dimples formed in the connection projections 164, 166. In other examples, the nibs and recesses could be switched such that the holder body 114 includes the nibs and the contact lever 116 includes the recesses.

In this example, when assembled the legs 152, 154 straddle the connection projections 164, 166.

In this example, the connection projections 164, 166 include rotation limiting features 168 that limit rotation of the contact lever 116 about axis 124. The end 142 of the contact lever 116 will abut the rotation limiting features 168.

Figure 5:
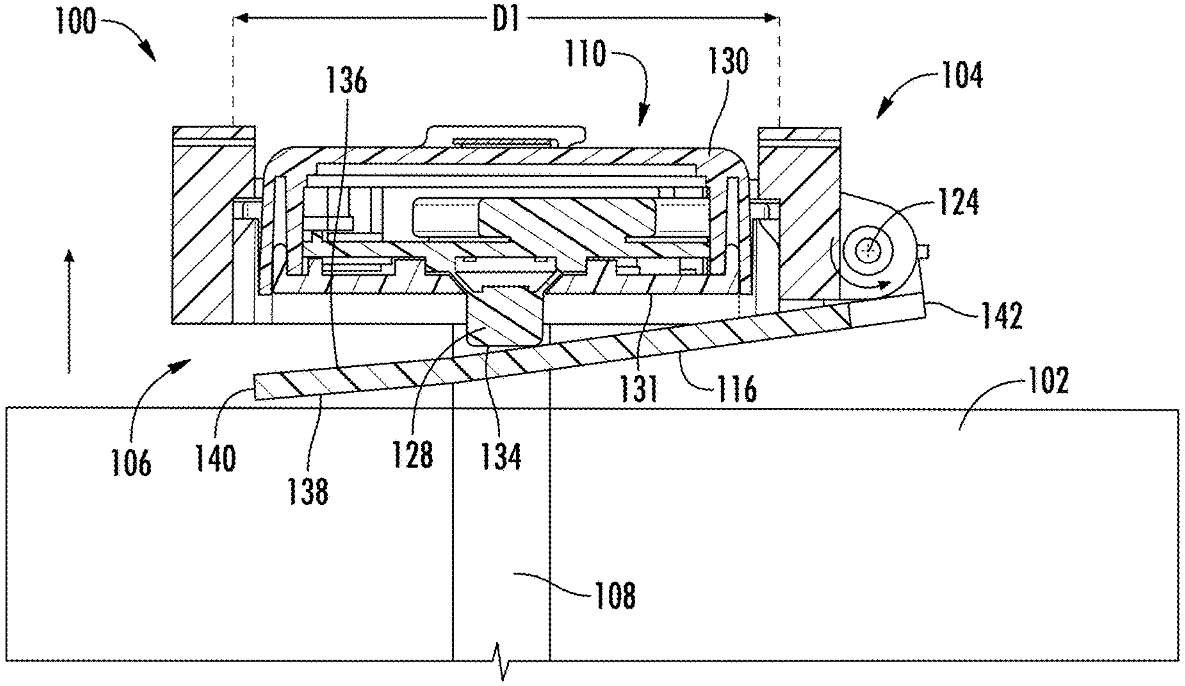
FIG. 5 is a cross-sectional illustration showing a second way that an alarm can be triggered.

In an example, the alarm button 128 of the security tag 110 is biased from the retracted state towards its extended state (e.g. the position illustrated in FIGS. 4 and 5). In the extended state, the alarm button 128 extends from the bottom 131 of housing 130 a greater extent than in the retracted state (FIG. 7). This biasing may be done by resilient biasing of parts of the alarm button 128 or by way of a biasing member such as a spring acting on the alarm button 128.

In an example, the biasing force acting on the alarm button 128 is sufficient to transition the contact lever 116 from the inactive position to the alarm position. Thus, when the security tag holder 106 is sufficiently moved away from the surface of the product 102, the biasing force will be sufficient to extend alarm button 128 to the extended state and cause the alarm to be generated by the security tag 110. There is no requirement, in some examples, for an external spring to transition the contact lever 116 from the inactive position to the alarm position.

With reference to FIGS. 1 and 2, the security tag holder 106 includes band retaining fingers 170, 172, 174, 176 operably attached to the holder body 114. Band retaining fingers 170, 172 form a first pair and band retaining fingers 174, 176 form a second pair. The band retaining fingers 170, 172 and 174, 176 of a pair are located on opposite sides of the security tag holding cavity 118 with the security tag holding cavity 118 interposed therebetween.

In this example, the band retaining fingers 170, 172 or 174, 176 of a pair of retaining fingers are oppositely oriented. As such, the band retaining fingers 170, 172 or 174, 176 extend opposite one another.

The band retaining fingers 170, 172, 174, 176 each include a connection portion 180 and a band retaining portion 182. The connection portion 180 secures the band retaining portion 182 to the top of corresponding sides of the holder body 114. In the illustrated example, the band retaining portion 182 extends in a cantilevered orientation from the connection portion 180.

A band receiving slit 184 is formed between the trap retaining portion 182 and the adjacent portion of the holder body 114. When mounted to a product 102, the retention band 108 is received in the band receiving slits 184 of the opposed pair of retaining fingers. The opposite orientation of the fingers 170, 172 or 174, 176 helps maintain securement of the retention band 108 within the band receiving slits 184. In this configuration, mouths 185 of the band receiving slits 184 associated with the pairs of band retaining fingers 170, 172 or 174, 176 open opposite one another. The mouths 185 are at opposite ends of the retaining portion 182 as the connection portion 180.

To further secure the retention band 108 relative to the security tag holder 106, retaining nibs 186 extend from the inner side of the band retaining portion 182 of the band retaining fingers 170, 172, 174, 176.

In an example, the holder body 114 includes recesses 188 that receive the retaining nibs 186.

While the illustrated example uses fingers 170, 172, 174, 176 that engage the retention band(s) 108, other embodiments can use other attachment arrangements. For example, the band could extend through the holder body 114 rather than use fingers. The band could be integrally molded/formed with holder body.

Figure 12:
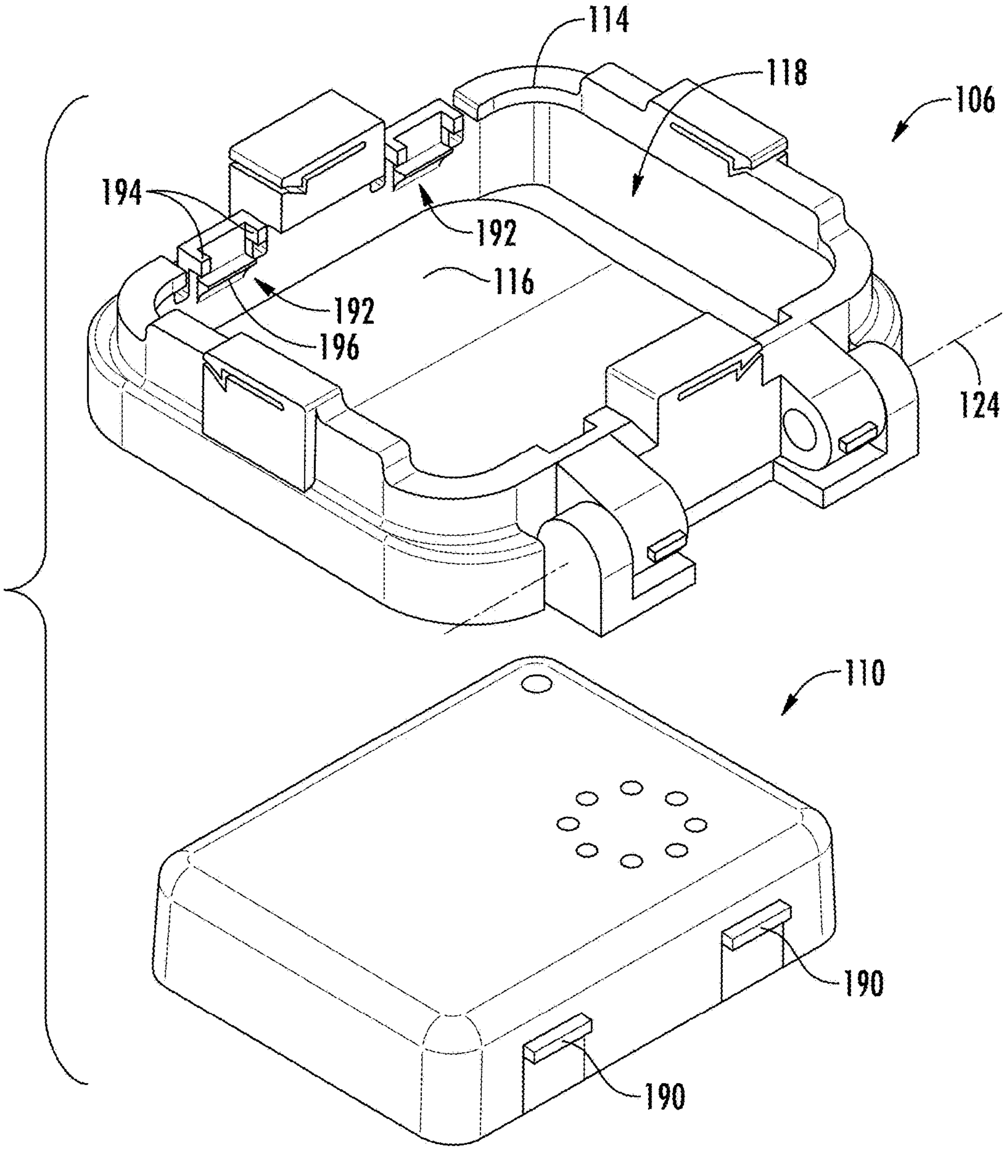
FIG. 12 is a partial exploded illustration of security tag holder and a security tag.

FIG. 12 illustrates a security tag 110 removed from the security tag holder 106. The security tag 110 includes attachment projections 190 that engage attachment features 192 of the security tag holder 106. The attachment features include first attachment tabs 194 that are spaced apart from one another laterally. The first attachment tabs 194 are also spaced apart from second attachment tab 196 forming a gap 198 therebetween. The attachment projections 190 of the security tag 110 are received in the gaps 198 to secure the security tag 110 within the security tag holding cavity 118 of the holder body 114.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A security tag holder comprising:

a holder body defining a security tag holding cavity;

a first band retaining finger attached to the holder body;

a second band retaining finger attached to the holder body on an opposite side of the security tag holding cavity as the first band retaining finger with the security tag holding cavity being interposed between the first and second band retaining fingers;

a security band being secured to the holder body by the first and second band retaining fingers, the security band extending across the security tag holding cavity when secured to the holder body such that the security tag holding cavity is positioned between the security band and the package when the security tag holder is in use such that a security tag located within the security tag holding cavity is located between the security band and the package in use.

2. The security tag holder of claim 1, wherein the first and second band retaining fingers are oppositely oriented relative to one another.

3. The security tag holder of claim 1, wherein each of the first and second band retaining fingers includes a connection portion and a band retaining portion, the connection portion securing the band retaining portion to the holder body.

4. The security tag holder of claim 3, wherein, for each of the first and second band retaining fingers, a band receiving slit is formed between the band retaining portion and the holder body.

5. The security tag holder of claim 4, wherein, for each of the first and second band retaining fingers, the band retaining portion extends from the connection portion over a portion of the holder body in a cantilevered orientation.

6. The security tag holder of claim 5, wherein, for each of the first and second band retaining fingers, the band retaining portion includes a retaining nib projecting towards the holder body.

7. The security tag holder of claim 6, wherein the holder body includes a first recess receiving the retaining nib of the first band retaining finger and the holder body includes a second recess receiving the retaining nib of the second band retaining finger.

8. The security tag holder of claim 3, wherein the holder body includes a first side and a second side, the first and second sides being spaced apart with the security tag holding cavity being positioned therebetween, the first band retaining finger being mounted to a top of the first side and the second band retaining finger being mounted to the top of the second side.

9. The security tag holder of claim 3, wherein a mouth of the band receiving slit associated with the first band retaining finger opens in an opposite direction as a mouth of the band receiving slit associated with the second band retaining finger.

10. A security tag holder comprising:

a holder body defining a security tag holding cavity;

a contact lever hingedly attached to the holder body for pivoting motion about a pivot axis, the contact lever extending across the security tag holding cavity, the contact lever having a free end spaced away from the pivot axis, the contact lever pivoting between an alarm position and an inactive position, the free end being positioned closer to the holder body in the inactive position than in the alarm position, the free end being positioned outside of the security tag holding cavity in at least the alarm position, the contact lever having an outer surface configured to engage a product to which the security tag holder is to be attached.

11. The security tag holder of claim 10, wherein the outer surface faces away from the holder body, the outer surface being curved at least proximate the free end.

12. The security tag holder of any one of claim 11, wherein the outer surface is curved for less than half of the distance between the free end and the pivot axis.

13. The security tag holder of claim 10, wherein the outer surface faces away from the holder body, the outer surface being convexly curved.

14. The security tag holder of claim 10, wherein the holder body has a bottom end, the bottom end including a notch therein, the contact lever being positioned with in the notch when in the inactive position.

15. The security tag holder of claim 14, wherein the contact lever may pivot about the pivot axis such that the pivot lever is flush with or recessed above the bottom end of the holder body.

16. The security tag holder of claim 10, wherein the holder body has a first side and a second side spaced from the first side, the security tag holding cavity being formed, at least in part, between the first and second sides, the first side having an inner face that faces towards the second side, the contact lever being pivotable about the pivot axis such that the free end is pivotable into the security tag holding cavity with the free end of the contact lever positioned adjacent to the inner face of the first side.

17. The security tag holder of claim 16, wherein the contact lever is hingedly attached to the holder body proximate the second side.

18. The security tag holder of claim 10, wherein the contact lever has a pair of legs that are laterally spaced apart along the pivot axis, the holder body includes at least one mounting projection, the pair of legs pivotally engaging the at least one mounting projection to pivotally secure the contact lever to the holder body.

19. The security tag holder of claim 18, further including a pair of nibs provided by the pair of legs or the at least one mounting projection and a pair of recesses provided by the other one of the pair of legs or the at least one mounting projection, the pair of nibs engaging the pair of recesses to secure the contact lever to the holder body, to define the pivot axis, and to permit pivotal motion between the holder body and the contact lever.

20. The security tag holder of claim 10, wherein the hinged attachment between the contact lever and the holder body is free of a separate hinge pin.

21. A security tag assembly comprising:

a security tag having:

a housing body having a bottom side; and an alarm button movable relative to the housing body between an extended state and a retracted state, the alarm button projecting from the bottom side a further distance in the extended state than in the retracted state; and a security tag holder of claim 9, the security tag being mounted within the security tag holding cavity, the contact lever transitioning the alarm button from the extended state to the retracted state when the contact lever is transitioned from the alarm position to the inactive position.

22. The security tag assembly of claim 21, wherein the alarm button is biased from the retracted state towards the extended state by a biasing force, the biasing force being sufficient to bias the contact lever from the inactive position to the alarm position when the contact lever is not in engagement with an object.

23. The security tag assembly of claim 21, further including a retention band for securing the security tag holder to an object, the retention band configured to maintain the contact lever in the inactive position when the security tag and retention band are mounted to the object.

24. The security tag assembly of claim 21, wherein the holder body includes:

a first band retaining finger attached to the holder body; and a second band retaining finger attached to the holder body on an opposite side of the security tag holding cavity as the first band retaining finger with the security tag holding cavity being interposed between the first and second band retaining fingers;

further including a retention band, the retention band being secured to the holder body by the first and second band retaining fingers.

25. A retail package comprising:

product;

a security tag assembly of claim 20;

a retention band extending around the product and securing the security tag assembly to the product, the retention band maintaining the contact lever in contact with an outer surface of the product to maintain the contact lever in the inactive position, the contact lever transitioning to the alarm position when the holder body is lifted away from the outer surface of the product or slid off of the product.

26. The retail package of claim 25, wherein the biasing force biasing the alarm button transitions the contact lever to the alarm position when the holder body is lifted away from the product or slid off of the product.

* * * * *